March 27, 1956
B. W. ROBERTS
2,740,088
GENERATOR CONTROL APPARATUS
Filed Jan. 10, 1955
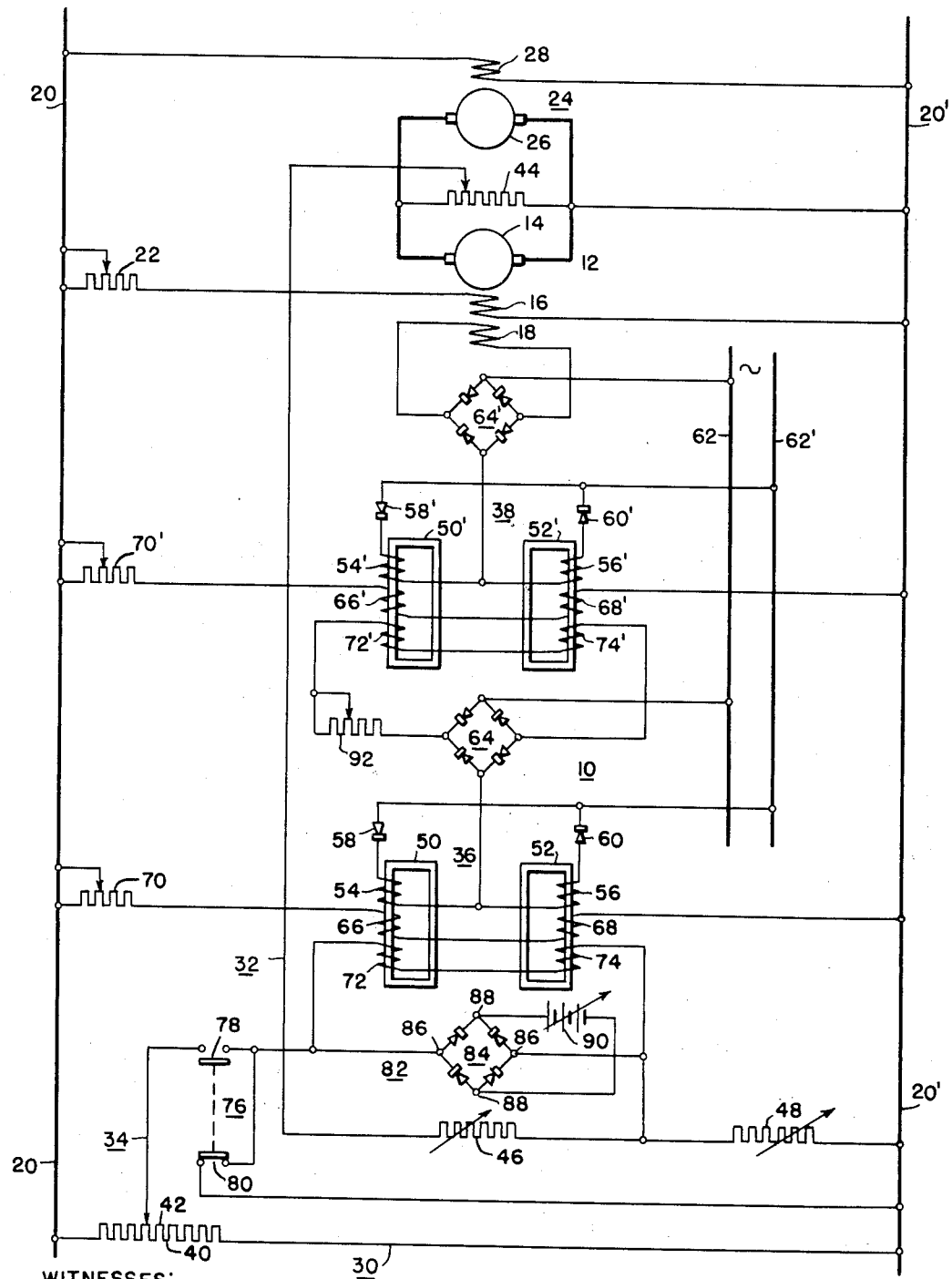
WITNESSES:
E. A. McCloskey
K. H. Thomas
INVENTOR
Billy W. Roberts.
BY
Ezra W. Savage
ATTORNEY

United States Patent Office 2,740,088
Patented Mar. 27, 1956

2,740,088

GENERATOR CONTROL APPARATUS

Billy W. Roberts, Buffalo, N. Y., assignor to Westinghouse Electric Corporation, East Pittsburgh, Pa., a corporation of Pennsylvania Application January 10, 1955, Serial No. 480,648

4 Claims. (Cl. 322—36)

This invention relates to electrical control apparatus and more particularly to control apparatus for limiting the magnitude of the forcing voltage applied to a generator.

When starting up a generator which supplies energy to a motor, it is oftentimes necessary to limit the rate at which the generator voltage builds up in order to prevent a flashover of the motor. The reason for this is that if the generator voltage builds up too rapidly the motor is unable to accelerate fast enough to handle this rapid increase in generator voltage, and thus, a flashover of the motor results. Also, if the motor is much larger than the generator then too rapid an increase in the generator voltage causes the generator itself to flashover.

The rate of change of generator voltage is determined by the magnitude of the forcing voltage applied to the generator field. The magnitude of the forcing voltage in turn is determined by the forcing factor which is the ratio between the maximum voltage applied to the generator field and the magnitude of that voltage which is under normal regulating conditions applied to the generator field. Thus, by limiting the magnitude of the voltage that can be applied to the generator field on starting the generator, damage to either the generator or motor can be prevented.

An object of this invention is to provide for limiting the magnitude of the forcing voltage applied to a generator field to thereby prevent either a flashover of the generator or a flashover of a motor supplied therefrom.

A specific object of this invention is to provide for producing a control effect on a generator field until an error signal, determined by the difference between a reference voltage and a measure of the output voltage of the generator, decreases on starting up the apparatus to a predetermined value, to thereby limit the magnitude of the forcing voltage applied to the generator field and thus prevent either a flashover of the generator or a flashover of a motor supplied therefrom.

A more specific object of this invention is to provide for limiting the magnitude of the forcing voltage applied to a generator field, by shunting a portion of the error signal around the control windings of a magnetic amplifier, which controls the forcing voltage, until the error signal decreases to a predetermined value upon starting the apparatus.

Other objects of this invention will become apparent from the following description when taken in conjunction with the accompanying drawing in which the single figure is a schematic diagram illustrating this invention.

Referring to the drawing, this invention is illustrated by reference to a regulator system 10 for maintaining the output voltage of a direct-current generator 12 substantially constant. In this instance, the generator 12 comprises an armature 14, a differential field winding 16, and a main shunt field winding 18. The function of the differential field winding 16 is to buck-out the residual magnetism of the generator 12. As illustrated the differential field winding is connected to be energized from conductors 20 and 20' which have applied thereto a substantially constant direct-current voltage. An adjustable resistor 22 is connected in series circuit relationship with the differential field winding 16 so that the magnitude of the current flow through the differential field winding 16 can be varied.

A direct-current motor 24, having an armature 26 and a field winding 28, is connected to be energized from the direct-current generator 12. As illustrated, the field winding 28 of the direct-current motor 24 is also connected to be energized from the conductors 20 and 20'. Since the regulator system 10 maintains the output voltage of the direct-current generator 12 substantially constant the speed of the direct-current motor 24 is likewise maintained substantially constant.

In general, the regulator system 10 comprises circuit means 30 for producing a substantially constant direct-current reference voltage, circuit means 32 for obtaining a measure of the direct-current output voltage of the generator 12, circuit means 34 for obtaining a direct-current error voltage which is a measure of the difference between the reference voltage and the measure of the output voltage of the generator 12, a first stage magnetic amplifier 36 which is responsive to the error voltage, and a second stage magnetic amplifier 38 which is responsive to the output of the magnetic amplifier 36 and which is connected to control the magnitude of the voltage across the main shunt field winding 18 of the generator 12.

Specifically, the circuit means 30 for producing a direct-current reference voltage comprises a variable resistor 40 having a movable contact member 42. In this instance, the resistor 40 is connected between the conductors 20 and 20' so as to have applied thereto a substantially constant direct current voltage. The reference voltage appears between the conductor 20' and the movable contact 42 of the resistor 40.

The circuit means 32 for obtaining a measure of the direct-current output voltage of the generator 12 comprises an adjustable resistor 44 which is connected across the armature 14 of the generator 12, and variable resistors 46 and 48 which are connected in series circuit relationship with one another, the series circuit being connected across a portion of the adjustable resistor 44. Thus, a direct-current voltage appears across the variable resistor 48 which is a measure of the output voltage of the generator. In practice, the resistance value of the resistor 48 is much larger than the resistance value of the resistor 46. By adjusting the variable resistor 48 the desired basic excitation can be obtained.

In this instance the magnetic amplifier 36 is a full-wave doubler-type self-saturating magnetic amplifier. The magnetic amplifier 36 comprises two magnetic core members 50 and 52 which have disposed in inductive relationship therewith load windings 54 and 56, respectively. In order to produce self-saturation for the magnetic amplifier 36, self-saturating rectifiers 58 and 60 are connected in series circuit relationship with the load windings 54 and 56, respectively. Energy for the load windings 54 and 56 is received from conductors 62 and 62' which have applied thereto a suitable alternating-current voltage. A full-wave dry-type rectifier 64 is so interconnected with the load windings 54 and 56 and with the conductors 62 and 62' as to produce at its output a direct-current voltage which represents the output voltage of the magnetic amplifier 36.

Bias windings 66 and 68 are disposed in inductive relationship with the magnetic core members 50 and 52, respectively. The bias windings 66 and 68 are connected in series circuit relationship with one another and in series circuit relationship with an adjustable resistor 70, the series circuit being connected between the conductors 20 and 20'. The function of the adjustable resistor 70 is to enable the magnitude of the current flow through the bias windings 66 and 68 to be varied. In operation, the current flow through the bias windings 66 and 68 produces magnetomotive forces that oppose the magnetomotive forces produced by the current flow through the load windings 54 and 56, respectively. Thus, the bias windings 66 and 68 function to bias the magnetic core members 50 and 52, respectively, a predetermined amount away from saturation.

In order to control the output voltage of the magnetic amplifier 36 in accordance with the magnitude of the direct-current error voltage obtained by the circuit means 34, control windings 72 and 74 are disposed in inductive relationship with the magnetic core members 50 and 52, respectively. In this instance the control windings 72 and 74 are connected in series circuit relationship with one another, the series circuit being connected by means of the circuit means 34 to the junction point of the resistors 46 and 48 and to the movable contact 42 of the resistor 40 when a relay 76 having contact members 78 and 80, is so positioned that its contact members 78 are in the circuit closed position. The function of the relay 78 is to provide either a reference voltage of zero magnitude reference voltage of predetermined magnitude as determined by the position of the movable contact 42 of the resistor 40. When a reference voltage of predetermined magnitude is provided, the contact members 78 are in the circuit closed position and the contact members 80 are in the circuit open position. On the other hand, when a reference voltage of zero magnitude is provided the contact members 78 and 80 are positioned as shown in the drawing.

Since the second stage magnetic amplifier 38 is similar to the first stage magnetic amplifier 36 like components of the magnetic amplifiers 36 and 38 have been given the same reference characters, however, the reference characters with respect to the magnetic amplifier 38 have been primed.

In accordance with the teaching of this invention, a control circuit 82 is connected in parallel circuit relationship with the series circuit including the control windings 72 and 74 of the magnetc amplifier 38. The control circuit 82 is such as to effect a shunting of a portion of the error current signal, produced by the direct-current error voltage, through the control circuit 82 while the error current signal is above a predetermined value on starting up the generator 12, to thus limit the magnitude of the output of the magnetic amplifier 36 until the error current signal decreases to the predetermined value. Such an action limits the forcing voltage applied to the main shunt field winding 18 of the generator 12 when the error current signal is above the predetermined value, and thus limits the rate of increase of generator output voltage to thereby prevent flashing of either the generator 12 or the motor 24 depending upon their relative sizes.

The control circuit 82 comprises a full-wave dry-type rectifier 84 having input terminals 86 and output terminals 88. As illustrated, the input terminals 86 of the rectifier 74 are connected in parallel circuit relationship with the series circuit including the control windings 72 and 74 of the magnetic amplifier 36. A source 90 of direct-current voltage is connected to the output terminals 88 of the rectifier 84, the voltage produced by the source 90 being of such polarity as to oppose the direct-current error voltage appearing between the movable contact 42 and the junction point of the resistors 46 and 48. In operation, the rectifier 84 functions to block the flow of current from the direct-current voltage source 90.

The operation of the apparatus illustrated in the drawing will now be described. When first starting up the generator 12, with the relay 76 position so that its contact members 78 are in the closed position, the reference voltage produced between the movable contact 42 of the resistor 40 and the conductor 20' is of greater magnitude than the measure of the output voltage of the generator 12 appearing across the resistor 48. Further, on first starting up the generator 12 this direct-current error voltage is of greater magnitude than the voltage produced by the source 90. Therefore, a portion of the error current effected by the direct-current error voltage flows through the rectifier 84 and the source 90 while the direct-current error voltage is above a predetermined value, namely, the magnitude of the voltage produced by the source 90. In particular, current flows from the movable contact 42 of the resistor 40 through the contact 78 of the relay 76, the rectifier 84, the source 90, and the rectifier 84, to the junction point of the resistors 46 and 48. Such an action limits the magnitude of the output voltage of the magnetic amplifiers 36 and 38, and thus limits the magnitude of the forcing voltage applied to the main shunt field winding 18 of the generator 12. This in turn prevents either a flashover of the generator 10 or of the motor 26, depending upon their relative sizes, since by limiting the magnitude of the forcing voltage applied to the field winding 18 the rate of rise of the output voltage of the generator 12 is limited.

When the direct-current error voltage, appearing between the movable contact 42 of the resistor 40 and the junction point of the resistors 46 and 48, decreases to the predetermined value where it is substantially equal to the magnitude of the voltage produced by the source 90, then current is no longer shunted through the control circuit 82. However, by the time the direct-current error voltage decreases to the predetermined value the system is approaching the steady-state operating condition where the regulator system 10 maintains the direct-current output voltage of the generator 12 substantially constant.

By changing the magnitude of the voltage produced by the source 90 the extent to which the forcing voltage applied to the field winding 18 of the generator 12 is limited, can be changed. That is, by decreasing the magnitude of the voltage produced by the source 90 a greater magnitude of error current is shunted through the control circuit 82, to thus limit to a further extent the magnitude of the forcing voltage applied to the main shunt field winding 18 of the generator 12. The magnitude of the forcing voltage applied to the field winding 18 can also be varied by means of a variable resistor 92.

It is to be understood that the apparatus embodying this invention not only effects a limiting of the forcing voltage applied to the field winding 18 of the generator 12 when it is first started up but also performs the function of limiting the forcing voltage applied to the field winding 18 when the magnitude of the reference voltage is manually changed to a different value.

The apparatus embodying the teaching of this invention has several advantages. For instance, the apparatus provides a means for controlling the rate of change of generator voltage without the use of a motor operated rheostat or current limit control. In addition, after the direct-current error voltage has exceeded a predetermined value the rate of change of generator voltage may be varied over a range of 4 or more to 1, depending on the construction of the apparatus. Further, the control circuit 82 functions to establish the rate of deceleration of the output voltage of the generator 12 as well as its rate of acceleration. For instance, when the junction point of the resistors 46 and 48 is at positive polarity with respect to the contact member 42 of the resistor 40, and the error voltage therebetween is of greater magnitude than the voltage of the source 90, error current will be shunted through the rectifier 84, the source 90, and the rectifier 84, to the contact member 42.

It is to be noted that each of the control windings 72 and 74, of the magnetic amplifier 36, functions as both a regulating and basic excitation winding. The reason they can so function is that the low magnitude of current flow through the control windings 72 and 74 enables one to have a high resistance value for the variable resistor 48 so as to obtain proper regulation and at the same time obtain sufficient gain in the regulator system 10. Owing to the low energy level of the control windings 72 and 74 the size of the variable resistor 40 and the rectifier 84 can be minimized.

Since certain changes may be made in the above apparatus and circuits and different embodiments of the invention could be made without departing from the scope thereof, it is intended that all matter contained in the above description or shown in the accompanying drawing shall be interpreted as illustrative and not in a limiting sense.

I claim as my invention:

1. In control apparatus for limiting the forcing voltage applied to a field winding of a generator, the combination comprising, means for producing a reference voltage, circuit means for obtaining a measure of the output voltage of the generator, means for obtaining an error signal which is a measure of the difference between the reference voltage and said measure of the output voltage of the generator, a magnetic amplifier controlled in accordance with the magnitude of said error signal and having an output connected to control the magnitude of the voltage across the field winding of the generator, and shunting means connected to control the magnitude of the output of the magnetic amplifier, the shunting means being such as to effect a shunting of a portion of the said error signal away from the magnetic amplifier while the said error signal is above a predetermined value on starting up the generator, to thus limit the magnitude of the output of the magnetic amplifier until the said error signal decreases to said predetermined value.

2. In control apparatus for limiting the forcing voltage applied to a field winding of a generator, the combination comprising, means for producing a reference voltage, circuit means for obtaining a measure of the output voltage of the generator, means for obtaining an error signal which is a measure of the difference between the reference voltage and said measure of the output voltage of the generator, a magnetic amplifier having a control winding and an output connected to control the magnitude of the voltage across the field winding of the generator, the control winding being connected to be responsive to said error signal, and a control circuit connected in parallel circuit relationship with said control winding, said control circuit being such as to effect a shunting of a portion of the said error signal through the said control circuit while the said error signal is above a predetermined value on starting up the generator, to thus limit the magnitude of the output of the magnetic amplifier until the said error signal decreases to said predetermined value.

3. In control apparatus for limiting the forcing voltage applied to a field winding of a generator, the combination comprising, means for producing a reference voltage, circuit means for obtaining a measure of the output voltage of the generator, means for obtaining an error voltage which is a measure of the difference between the reference voltage and said measure of the output voltage of the generator, a magnetic amplifier having a control winding and an output connected to control the magnitude of the voltage across the field winding of the generator, the control winding being connected to be responsive to said error voltage, and a control circuit connected in parallel circuit relationship with said control winding, said control circuit including a source of voltage of such polarity as to oppose the said error voltage, so that a portion of the current effected by the said error voltage flows through the said control circuit while the said error voltage is above a predetermined value on starting up the generator, to thus limit the magnitude of the output of the magnetic amplifier until the said error voltage decreases to said predetermined value.

4. In control apparatus for limiting the forcing voltage applied to a field winding of a generator supplying energy to a motor, the combination comprising, means for producing a reference voltage, circuit means for obtaining a measure of the output voltage of the generator, means for obtaining an error voltage which is a measure of the difference between the reference voltage and said measure of the output voltage of the generator, a magnetic amplifier having a control winding and an output connected to control the magnitude of the voltage across the field winding of the generator, the control winding being connected to be responsive to said error voltage, a rectifier having an input and an output, the input of the rectifier being connected in parallel circuit relationship with said control winding, and a source of voltage connected to the output of the rectifier, said rectifier functioning to block the flow of current from said source of voltage and the voltage produced by the said source of voltage being of such polarity as to oppose the said error voltage, so that a portion of the current effected by the said error voltage flows through the said rectifier and the said source of voltage while the said error voltage is above a predetermined value on starting up the generator, to thus limit the magnitude of the output of the magnetic amplifier until the said error voltage decreases to said predetermined value.

No references cited.